(12) United States Patent
Geens et al.

(10) Patent No.: US 7,082,482 B2
(45) Date of Patent: Jul. 25, 2006

(54) DATA HANDLING DEVICE

(75) Inventors: Ronald Maria Albert Geens, Schoten (BE); Luk Vogel, Antwerp (BE)

(73) Assignee: Alcatel, Paris (FR)

( * ) Notice: Subject to any disclaimer, the term of this patent is extended or adjusted under 35 U.S.C. 154(b) by 227 days.

(21) Appl. No.: 10/739,158

(22) Filed: Dec. 19, 2003

(65) Prior Publication Data
US 2004/0153619 A1    Aug. 5, 2004

(30) Foreign Application Priority Data
Dec. 26, 2002   (EP) .................................. 02293246

(51) Int. Cl.
*G06F 3/00* (2006.01)
(52) U.S. Cl. ............................ 710/52; 710/22; 710/48; 710/53
(58) Field of Classification Search ..................... None
See application file for complete search history.

(56) References Cited

U.S. PATENT DOCUMENTS

| | | | |
|---|---|---|---|
| 5,920,705 A | | 7/1999 | Lyon et al. |
| 6,041,328 A | * | 3/2000 | Yu ............................... 707/10 |
| 6,052,387 A | * | 4/2000 | Chow et al. ................. 370/474 |
| 6,532,503 B1 | * | 3/2003 | Lindeborg et al. ............ 710/52 |
| 6,704,021 B1 | * | 3/2004 | Rogers et al. ............... 345/543 |
| 6,874,039 B1 | * | 3/2005 | Ganapathy et al. ........... 710/28 |
| 2001/0019554 A1 | | 9/2001 | Nomura et al. | |

FOREIGN PATENT DOCUMENTS

EP           0 475 647 A1    3/1992

* cited by examiner

*Primary Examiner*—Kim Huynh
*Assistant Examiner*—Niketa Patel
(74) *Attorney, Agent, or Firm*—Sughrue Mion, PLLC

(57) ABSTRACT

A data handling device comprising a communication controller, having a data gate provided for receiving and transmitting data, said communication controller being connected to a processor having an n-bits addressing capacity and to a memory having a set of buffers comprising a first subset provided for storing data segments retrieved from said data and which buffers of said first subset are accessible under control of said processor by a buffer address indicating a buffer location in said memory and generated by using a buffer descriptor stored in a buffer descriptor list, said memory having a second subset of buffers which are not accessible by said addressing capacity. Said buffers of said second subset being addressable by using further buffer descriptors stored in said buffer descriptor list. Said processor comprising driving means for managing the transfer of data segments between the buffers of the first and second subset.

5 Claims, 6 Drawing Sheets

DATA HANDLING DEVICE

The present invention relates to a data handling device comprising a communication controller, having a data gate provided for receiving data, said communication controller being connected to a processor having an n-bits addressing capacity and to a memory having a set of buffers comprising a first subset provided for storing data segments retrieved from said data and which buffers of said first subset are accessible under control of said processor by a buffer address indicating a buffer location in said memory and generated by using a buffer descriptor stored in a buffer descriptor list, said communication controller comprising an interrupt generator provided for generating an interrupt signal upon transferring a data segment stored into one of said buffers of said first subset, said data handling device further comprising driving means provided for managing said descriptor list, said processor comprising a driver provided for passing said data segments to an application running on said processor. The present invention further relates to a data handling device provided for transferring data.

Such data handling devices are for example known as communication controllers in particular those which are provided for handling large amounts of data, such as for example Internet routing tables. Since the processor has an n-bits address bus it can address $2^n$ addresses, part of which is used for addressing memory, where the data to be transferred can be temporarily stored. Under data to be transferred there should be understood as well incoming data as outgoing data. The memory comprises a first subset of buffers which are addressed by the processor and use the buffer descriptors available in the buffer descriptor list. So, each time when a new data has to be transferred, the processor verifies in the list, available within the communication controller, if there is a buffer descriptor indicating an empty buffer available. If this is the case, the data segment retrieved from the data stream is loaded into the buffer indicated by the available buffer descriptor. The buffer descriptor is thereafter marked as being no longer available and an interrupt signal is generated.

A drawback of the known data handling device is that for some applications the buffer capacity, addressable by the processor, is not enough. Increasing the address bus or using another operating system is for costs reasons unattractive.

It is an object of the invention to realise a data handling device capable of storing a large amount of data without increasing either the addressing capability of the processor or the available memory space.

For this purpose, a data handling device, according to the present invention, is characterised in that said set of buffers comprises a second subset located in a part of said memory, which is inaccessible by said processor addressing capacity and which buffers of said second subset are accessible by using a further buffer descriptor describing said buffers of said second subset and stored in said buffer descriptor list, said driving means being provided for recognising that an incoming data segment has been stored into one of said buffers of said second subset and for transferring a data segment stored into said second subset to a buffer of one of said first subset asynchronously with said application running on said processor. The availability of the second subset of buffers is the part which is not accessible by addressing capacity of the processor, enables to increase the available buffer capacity without increasing the addressing capacity. By assigning to each buffer of the second subset a second buffer descriptor, the buffers of the second subset can be handled by the driving means in the same manner as the buffers of the first subset. The transfer of the content of the second buffers to the first buffers enables to render the data segments, first stored in the second buffers, to be loaded in the first buffers and thus to become accessible for the processor.

A first preferred embodiment of a data handling device according to the present invention is characterised in that said driving means comprises a direct memory access engine co-operating with said processor by means of interrupt signals, said direct memory access engine being provided for executing said transfer between said buffers of said first and second subset. The use of such a direct memory access engine enables a reliable control of the transfer within the memory.

The invention will now be described in more details with reference to the drawings illustrating a preferred embodiment of a data handling device according to the present invention. In the drawings.

Figure 1:
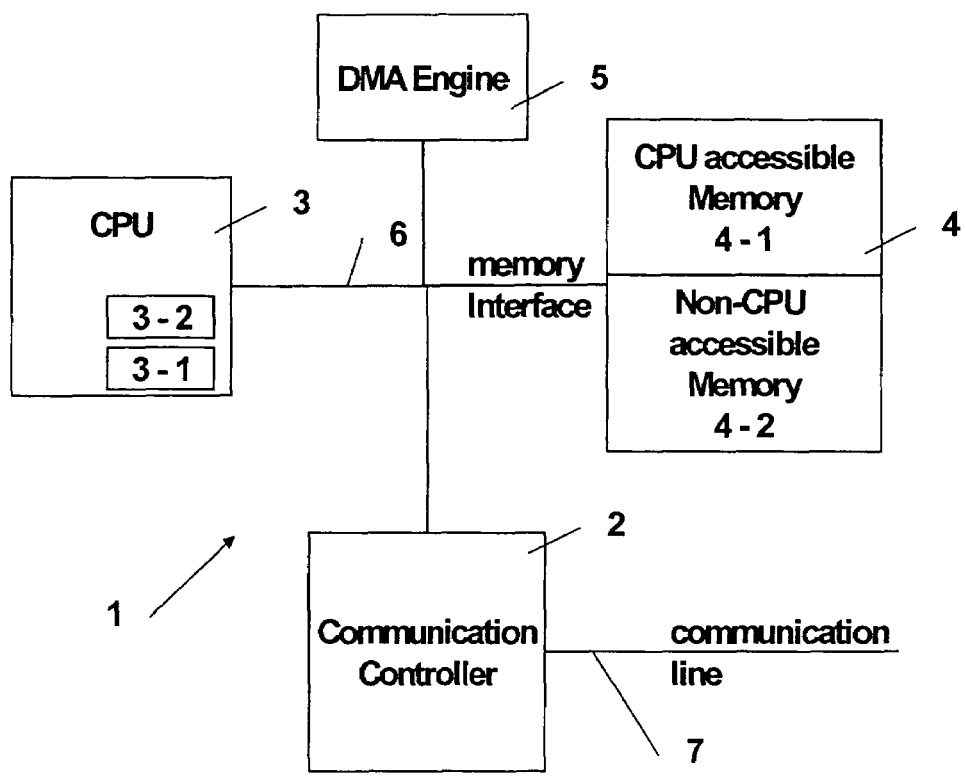
FIG. 1 shows by means of a blockscheme a data handling device according to the present invention.

In the drawings a same reference sign has been allotted to a same or analogous element.

As illustrated in FIG. 1, a data handling device 1, according to the present invention comprises a communication controller 2, connected to a processor 3 and a memory 4. A DMA (Direct Memory Access) engine 5 is also connected to the communication controller, the processor and the memory. The connection between those different components is realised by means of a bus 6 having at least data and address lines. Instead of using a DMA engine, a co-processor co-operating with said processor 3 could also be used. For the sake of clarity, the further description will be limited to the use of a DMA engine. If a co-processor is used, the operation is analogous as with the DMA engine. The address bus is an n-bits address bus, preferably n=32 bits, which is not only largely available on the market but also enables to address $2^n$ address locations.

The capacity of the address bus is not the only determining factor for the addressing capacity of the processor. The addressing capacity of the operating system running on the processor should also be taken into account as both the capacity of the address bus and the operating system determine together the addressing capacity of the processor and well in such a manner that the one having the lowest capacity or n value is dominant.

A communication line 7 is connected to a data gate of the communication controller 2, in order to supply data to the communication controller and to further transport data, supplied by the communication controller. The data received by the communication controller is preferably segmented by the latter in order to store and process the data segmentwise. The processed data can further be converted by the communication controller from segments to any desired format suitable for transmission over the communication line.

Figure 2:
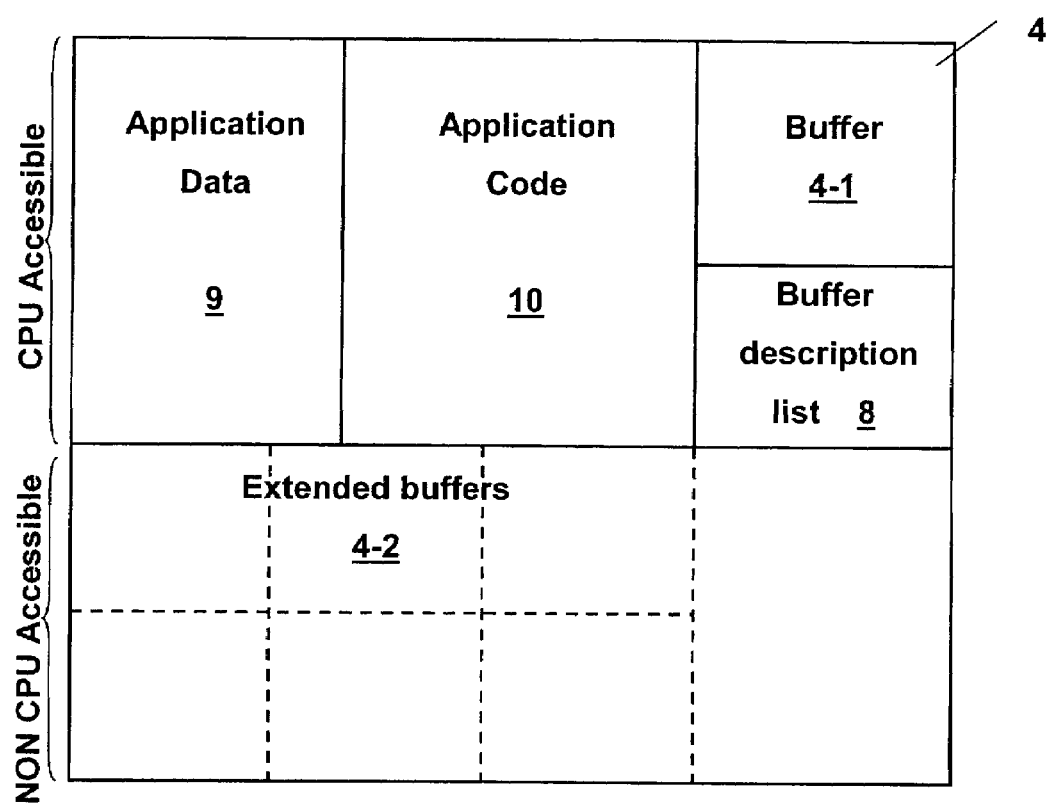
FIG. 2 shows an example of an internal organisation of the memory as part of the data handling device.

The memory 4 is divided in a processor accessible part 4-1 and a processor non-accessible part 4-2. This signifies that part 4-1 is addressable by means of the addresses supplied by the processor to the address bus, whereas part 4-2 can not be addressed by those addresses. FIG. 2 illustrates the internal organisation of the memory 4 in more detail. The memory further comprises a buffer descriptor list 8 as well as an application data part 9 and an application code part 10. Preferably, the non-accessible part 4-2 is at least partially partitioned, as indicated by the dotted lines. Each partition represents a buffer. The accessible part 4-1 also comprises at least one buffer. In order to distinguish the buffers in the accessible part 4-1 from those in the non-accessible part 4-2, those in the accessible part will be referred to as a first subset of buffers, whereas those in the non-accessible part will be referred to as a second subset of buffers. The first and second subset forming together the set of buffers.

The processor 3 is provided with drive 3-1. The driver 3-1 controls the software running on the hardware of the processor and therefore communicates with an application 3-2, situated on a higher layer. The driver also communicates with the communication controller 2 and the DMA engine 5 by means of interrupt signals. The driving means is also provide for managing the buffer descriptor list 8. The driving means is preferably implemented as the DMA engine 5 or a co-processor. The driver further populates the buffer descriptor list 8 by forming and updating buffer descriptors.

The driving means have an extended addressing capability which signifies that they can address not only the buffers of the first subset, but also those of the second subset. Therefor the driving means are capable of passing data segments to an application running on the processor and of transmitting data segments to and from the second subset, asynchronously with an application running on the processor.

Figure 3:
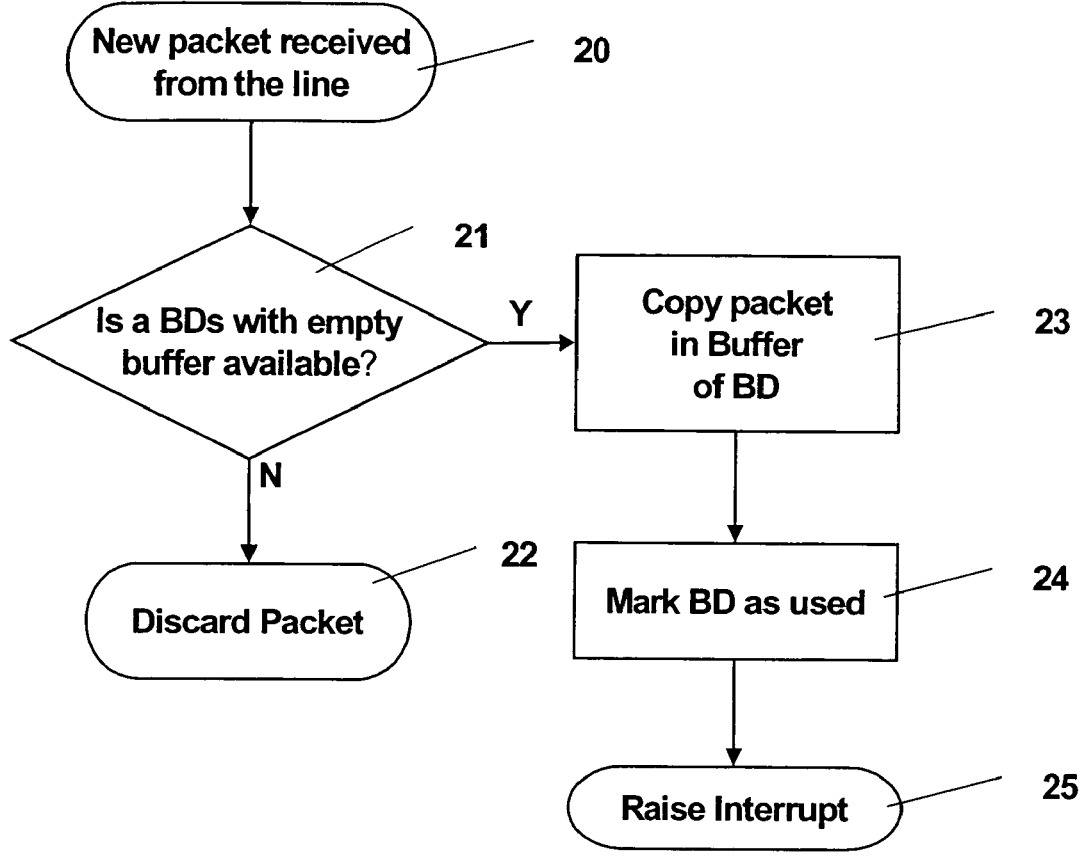
FIG. 3 shows a flowchart setting out the buffer descriptor mechanism.

As illustrated in FIG. 3, when a new data is received (20) on the communication line 7, the communication controller will generate an interrupt towards the processor and verify (21) if a buffer of the first subset is available. It should be noted that for the sake of clarity, the further description will only refer to the processing of received data. However the present invention is not limited to the processing of received data and is as well applicable to the transmission over the communication line 7 of data, which have been processed by the processor 3.

The verification (21) is realised by using the buffer descriptor list 8 wherein buffer descriptors are stored. Those buffer descriptors indicate a.o. whether the concerned buffer is available or not. The buffer descriptor list 8 is managed by the driving means and is accessible by the processor 3. If the buffer descriptors indicate no available buffer within the first part, then in a device according to the state of the art, the received data is discarded (22). If on the other hand a buffer is available (21;y), the received data, after being segmented, is transferred (23) segmentwise to those buffers which, based on the buffer descriptors are indicated as available. Subsequently, the used buffers are marked (24) as occupied in the buffer descriptor list and an interrupt signal is generated (25) by the processor.

Figure 4:
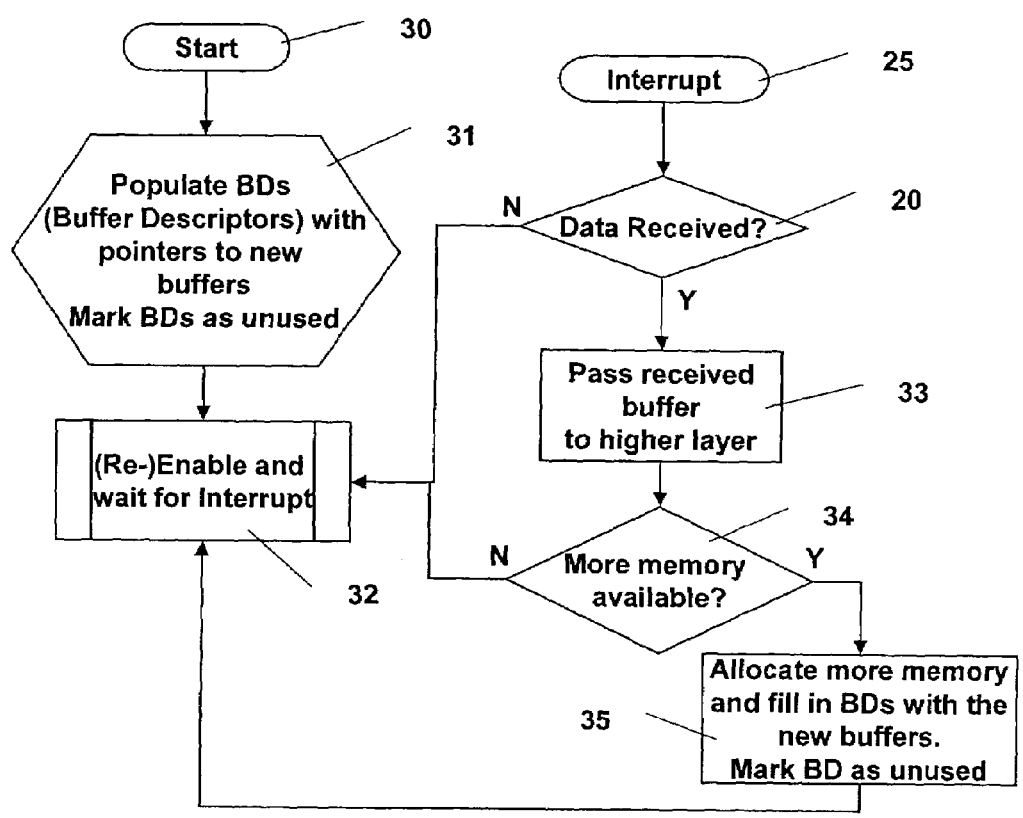
FIG. 4 shows a flowchart setting out the addressing of the buffers belonging to the first subset.

The management of the buffer descriptor list is illustrated in FIG. 4. A trigger signal is generated (30) by the processor under control of which the buffer descriptors in the list are populated (31) with pointers to buffers in the first subset, indicating which buffers are available and marked as such. The buffer list is thereafter enabled (32).

When an interrupt signal has been generated (25) and no data has been received (20;n) the used buffer is re-enabled (32). If on the other hand the interrupt signal originates from the communication controller following the receipt of data (20;y), the latter is processed (33). There is further verified (34) if more memory buffers are available. If this is the case (34;y), more memory buffers are allocated and the buffer descriptor list is updated (35) with those allocated buffers. Thereafter the buffer descriptor list is re-enabled (32).

The fact that data could be discarded (22) poses a problem in modern high speed communication lines transporting databursts at high speed. Those databursts need to be buffered before the higher layer software can process them. Moreover, the memory buffers of the first subset need to be allocated for worst case message-sizes.

In order to solve the problem of discarding available data, use is made, according to the present invention, of the second subset of buffers which are in the non-accessible part. The use of this second subset of buffers requires however their addressing and the handling of the data which will be temporarily stored therein. The addressing of the buffers of the second subset is for example realised by using the DMA engine 5 (FIG. 1) or the co-processor which is provided for accessing more than the $2^n$ addresses. Alternatively the communication device could be provided to handle more than $2^n$ bits addresses or could be configured, for example via a PCI (Peripheral Control Interface) for the same purpose. Furthermore the driving means has to be modified in order to use the second subset of buffers.

Figure 5:
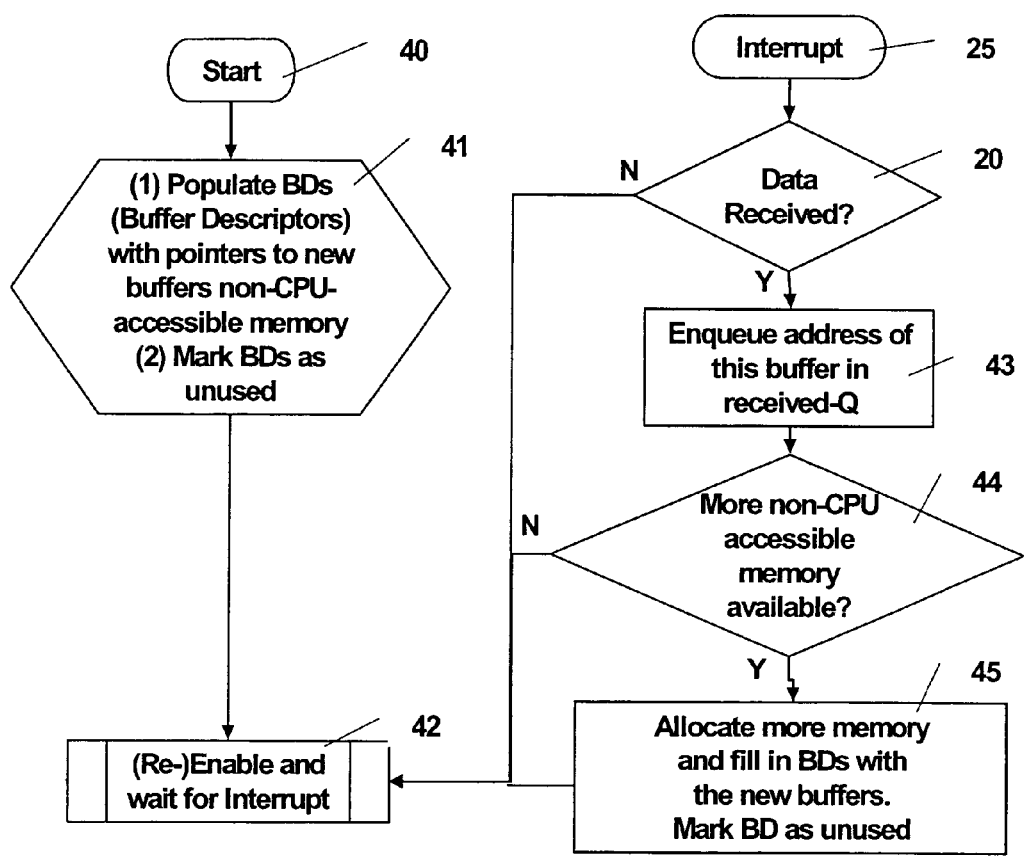
FIG. 5 shows a flowchart setting out the addressing of the buffers belonging to the second subset.

FIG. 5 illustrates by means of a flowchart how the management of the buffers has been adapted in order to deal with the first and second subset of buffers. A trigger signal is generated (40) by the driver under control of which the buffer descriptors in the list are populated (41) with pointers to buffers in the second subset which are available and marked as such. The buffer list is thereafter enabled (42).

After generation (25) of an interrupt signal and provided that a data has been received (20;y) by the communication controller, the buffer list is enqueued (43) by the DMA by taking the address of an available buffer. The received data segments are then temporarily stored in the selected buffer which is consequently marked as occupied. The DMA then sends an interrupt signal to the processor. Steps 44 and 45 are comparable with those described in FIG. 4, namely step 34 and 35, with the exception that now buffers of the second subset are considered.

Figure 6:
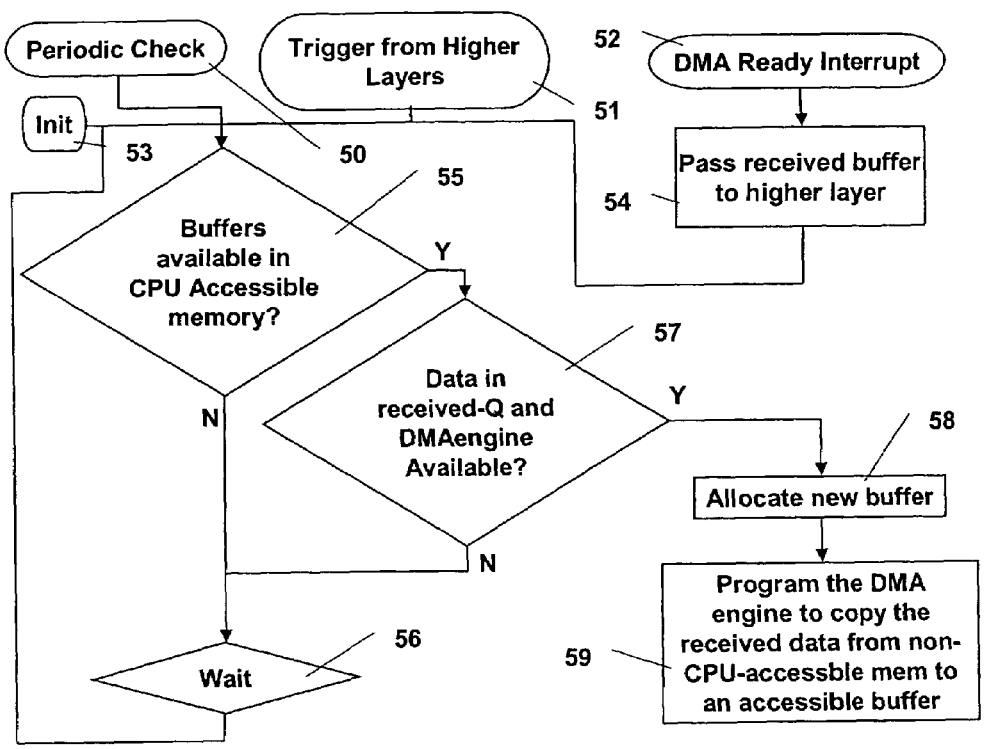
FIG. 6 shows a flowchart setting out the transfer from the data segments stored in a buffer of the second subset to a buffer of the first subset.

Since now data segments could be stored as well in the first as the second subset of buffers, and since the processor can only access those data which are in the first subset, it is necessary to check whether buffers of the second subset are occupied in order to process the data segments stored therein. FIG. 6 illustrates, by means of a flowchart, how the data segments stored in the second subset buffers are handled. Several trigger signals could be used to start this procedure. In order to not multiply the flowcharts, the different trigger signals have been aligned on top of the flowchart. The handling could be started by a periodic check (50) generated by the driver, by a trigger from a higher layer (51), a DMA ready interrupt (52) generated by the DMA engine or by an initialization signal (53) generated by the processor. If a DMA ready interrupt has been generated, the received buffer is passed (54) to a higher application layer. After triggering there is checked (55) if buffers of the first subset are available. If no such buffers are available (55;N) the driving means will wait for another interrupt signal as it is not possible to transfer the data from the second to the first subset. If on the other hand (55;y) buffers of the first subset are available, there is checked (57) if there are occupied buffers of the second subset. This is for example realised by means of the buffer list which also comprises further descriptors for describing the buffers of the second subset.

When the driver has established (57;y) that a buffer of the second subset is occupied, an interrupt signal is sent (58) to the DMA as well as an indication to the buffer in the second subset to be read and the address of the buffer in the first subset where the data should be stored. Upon receipt of the latter instructions, the DMA will asynchronously with the operation of the driver, copy (59) the data segment from the indicated buffer in the second subset to the one indicated in the first subset. The DMA will thereafter generate an interrupt and send it to the driver in order to indicate that the copying operation is accomplished. Since the data segment is now in one of the buffers of the first subset, it will be handled by the processor in the usual way. By using the DMA for copying the data segment into a buffer of the first subset, the processing capacity of the processor is not affected since this operation is realised asynchronously with the application run by the processor. The DMA can in such a manner handle $2^{n+m}$ buffer addresses, where m is the number of address bits with which n has been extended. Since the application layer is not affected by this copying of data, there is no need to extend the addressing capacity of the processor nor to modify the application, which offers a substantial cost saving.

For transmission of data from the communication controller to the communication line, an analogous method is applied, with the difference however that the data segment written into a buffer of the first subset is copied into a buffer of the second subset by the DMA. Therefor the processor requests the DMA to copy a data segment for a buffer of the first subset to one of the second subset. Once this copying is realised the DMA sends an interrupt to the processor and the further descriptor of the buffer in the second subset into which the data segment has been copied is marked as occupied in the buffer descriptor list. The data segment to be transmitted will then be retrieved from that buffer of the second subset and passed to the communication controller.

In case that the communication controller is only provided for accessing the first subset, but an enhanced DMA engine is available i.e. which can read and write in both subsets, it is possible to use the second subset. Therefor the data packages are loaded by the DMA into the second subset immediately after reception and copied back into the first subset as soon as the processor needs them.

The invention claimed is:

1. A data handling device comprising:
   a communication controller having a data gate provided for receiving data,
   a processor having an n-bit addressing capacity;
   a memory having a set of buffers; and
   a driving means provided for addressing the memory;
   wherein the communication controller, the processor, the memory and the driving means are connected to each other; and
   wherein the memory having a set of buffers further comprises:
   a first subset of buffers provided for storing data segments retrieved from the received data and is accessible to the processor through a buffer address indicating a buffer location in the memory, wherein the buffer address is generated by using a buffer descriptor stored in a buffer descriptor list;
   a second subset of buffers which is not accessible by the processor and is accessible by using a further buffer descriptor describing the second subset of buffers and where the further buffer descriptor is stored in the buffer descriptor list; and
   wherein the communication controller further comprises an interrupt generator provided for generating an interrupt signal upon transferring the received data segments into a buffer of the first subset of buffers; and
   wherein the processor further comprises a driver for passing the data segments to an application running on the processor ;and
   wherein the driving means manages the buffer descriptor list, and upon recognizing that an incoming data segment has been stored in a buffer of the second subset of buffers, transfers the data segment stored in the buffer of the second subset of buffers to a buffer of the first subset of buffers asynchronously while the application is running on the processor.

2. A data handling device as claimed in claim 1, wherein the driving means is a direct memory access controller co-operating with the processor by means of interrupt signals, the direct memory access controller being provided for executing the transfer of the data segments between the first subset of buffers and the second subset of buffers.

3. A data handling device as claimed in claim 1, wherein the driving means is a co-processor co-operating with the processor by means of interrupt signals, the co-processor being provided for executing the transfer of the data segments between the first subset of buffers and the second subset of buffers.

4. A data handling device as claimed in claim 2, wherein the execution of the transfer of the data segments is realized under control of a copying instruction.

5. A data handling device comprising:
   a communication controller having a data gate provided for transmitting data;
   a processor having an n-bit addressing capacity;
   a memory having a set of buffers; and
   a driving means provided for addressing the memory;
   wherein the communication controller, the processor, the memory and the driving means are connected to each other; and
   wherein the memory having a set of buffers further comprises:
   a first subset of buffers provided for storing data segments to be transmitted and is accessible by the processor through a buffer address indicating a buffer location in the memory, wherein the buffer address is generated by a buffer descriptor stored in a buffer descriptor list; and
   a second subset of buffers, which is inaccessible by the processor and which is accessible by using a further buffer descriptor describing the second subset of buffers and where the further buffer descriptor is stored in the buffer descriptor list; and
   wherein the communication controller further comprises an interrupt generator provided for generating an interrupt signal upon transferring the data segments to a buffer of the first subset of buffers; and
   wherein the processor further comprises a driver provided for retrieving the data segments from an application running on the processor; and
   wherein the driving means manages the buffer descriptor list, and upon recognizing that the data segments to be transmitted is stored in a buffer of the first subset of buffers, transfers the data segments stored in the buffer of the first subset of buffers to a buffer of the second subset of buffers asynchronously while the application is running on the processor,
   the driving means also provided for updating the buffer descriptor list containing the further buffer descriptor describing the second subset of buffers to which the data segments have been transferred, the driving means further provided for managing the transmission of the data segments stored in the second subset of buffers to the communication controller.

* * * * *